(12) United States Patent
Krumsiek

(10) Patent No.: US 8,249,726 B2
(45) Date of Patent: Aug. 21, 2012

(54) METHOD AND DEVICE FOR ACCESSING A FUNCTIONAL MODULE OF AUTOMATION SYSTEM

(75) Inventor: Dietmar Krumsiek, Emmerthal (DE)

(73) Assignee: Phoenix Contact GmbH & Co. KG (DE)

( * ) Notice: Subject to any disclaimer, the term of this patent is extended or adjusted under 35 U.S.C. 154(b) by 312 days.

(21) Appl. No.: 12/610,626

(22) Filed: Nov. 2, 2009

(65) Prior Publication Data

US 2010/0114334 A1 May 6, 2010

(30) Foreign Application Priority Data

Nov. 3, 2008 (DE) .......................... 10 2008 055 660

(51) Int. Cl.
*G05B 19/18* (2006.01)
(52) U.S. Cl. ..................... 700/3; 700/9; 700/19; 700/95
(58) Field of Classification Search .................... 700/19, 700/95, 3, 9; 1/1
See application file for complete search history.

(56) References Cited

U.S. PATENT DOCUMENTS

| | | | | |
|---|---|---|---|---|
| 6,192,282 B1 * | 2/2001 | Smith et al. | ..................... | 700/19 |
| 6,311,101 B1 | 10/2001 | Kastner | | |
| 6,327,511 B1 * | 12/2001 | Naismith et al. | ................ | 700/19 |
| 6,785,805 B1 * | 8/2004 | House et al. | ....................... | 713/1 |
| 6,788,980 B1 * | 9/2004 | Johnson | ............................. | 700/1 |
| 6,799,077 B1 * | 9/2004 | Hauet | ............................... | 700/2 |
| 6,985,779 B2 * | 1/2006 | Hsiung et al. | .................... | 700/19 |
| 7,151,966 B1 * | 12/2006 | Baier et al. | ....................... | 700/19 |
| 7,233,830 B1 * | 6/2007 | Callaghan et al. | ................ | 700/9 |
| 7,313,447 B2 * | 12/2007 | Hsiung et al. | ..................... | 700/9 |
| 7,565,351 B1 * | 7/2009 | Callaghan | ............................ | 1/1 |
| 2002/0016639 A1 * | 2/2002 | Smith et al. | ....................... | 700/9 |
| 2005/0038528 A1 * | 2/2005 | McKelvey et al. | .............. | 700/17 |
| 2005/0131551 A1 * | 6/2005 | Ruutu et al. | ....................... | 700/1 |

(Continued)

FOREIGN PATENT DOCUMENTS

| | | |
|---|---|---|
| DE | 102 14 539 A1 | 10/2003 |
| DE | 699 21 446 T2 | 10/2005 |

(Continued)

OTHER PUBLICATIONS

"European Search Report for European International Application No. EP 09013571", Nov. 10, 2010, Publisher: European Patent Office, Published in: EP.

(Continued)

*Primary Examiner* — Ramesh Patel
*Assistant Examiner* — Anthony Whittington
(74) *Attorney, Agent, or Firm* — Kaplan Breyer Schwarz & Ottesen LLP

(57) ABSTRACT

The present invention proposes a method for accessing a functional module (118, 128, 138) of an automation system, wherein the automation system comprises a device in the form of higher-level device (200) and at least one lower-level device (110, 120, 130) arranged under this higher-level device and wherein the functional module (118, 128, 138) is in the form of part of the one or more lower-level devices (110, 120, 130) and for executing at least one device function. In addition, a device in the form of the higher-level device (200) for performing the method in an automation system is also proposed, wherein at least one device (110, 120, 130) comprising a functional module (118, 128, 138) for executing at least one device function is arranged under the higher-level device.

36 Claims, 1 Drawing Sheet

U.S. PATENT DOCUMENTS

2006/0142875 A1 * 6/2006 Keyes et al. .................. 700/1

FOREIGN PATENT DOCUMENTS

| DE | 10 2008 014 153 A1 | 10/2008 |
|---|---|---|
| DE | 10 2008 019 040 A1 | 10/2008 |
| EP | 0 825 506 A2 | 2/1998 |
| EP | 0 917 034 A1 | 5/1999 |
| WO | 2008/125336 A2 | 10/2008 |

OTHER PUBLICATIONS

German Patent Office, Office Action dated Jul. 27, 2009, Reference Number: 10 2008 055 6602-55, Applicant: Phoenix Contact GmbH, Dipl.-Ing. Wigner.

* cited by examiner

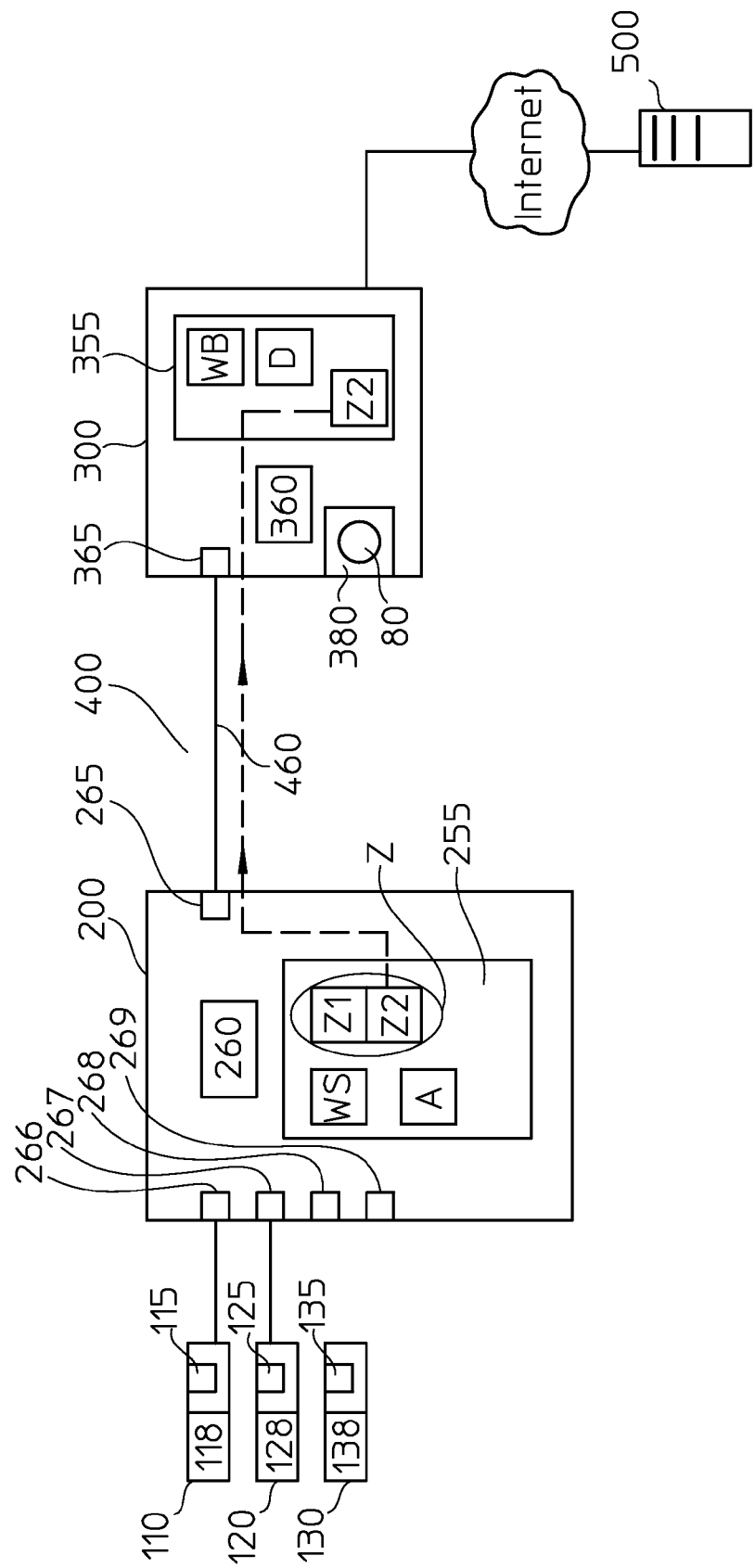

METHOD AND DEVICE FOR ACCESSING A FUNCTIONAL MODULE OF AUTOMATION SYSTEM

FIELD OF INVENTION

The invention relates to a method and to a device for accessing a functional module of an automation system.

BACKGROUND OF THE INVENTION

In the field of industrial manufacturing automation and in automation systems used in this field, today it is widely common to parameterize, to analyze, or also to set into operation (field) devices, such as SPS, sensors, or actuators or a functional module possessed by these devices by means of an operating interface provided to an operating device connected to the appropriate device, e.g., by means of a network.

Here, up until now essentially two approaches have been known: first, software applications that must be installed on the operating device that can involve, for example, a PC or a notebook; second, Web-based applications for which a conventional Web browser on the operating device is sufficient, because the application itself is executed on a Web server that is integrated in the appropriate (field) device, below also called simply device, or is transmitted at the beginning of a session from the Web server to the operating device and then executed there.

The software applications mentioned first, also called software tools below, today follow, as a rule, the so-called FDT/DTM concept (field device tool/device type manager). Here, a DTM is to be understood to be a driver program for a specific device and includes its functions, structure, and parameterization. In addition, a DTM offers a GUI (graphical user interface) including a help system. The DTM can obtain the required device-specific information, e.g., from a standardized device description, for example, a GSD file (general station description), provided, for example, to the DTM from the manufacturer of the device, e.g., via the Internet. FDT defines the interface between the device-specific DTM and an application framework, e.g., an engineering tool.

The sensors and actuators can be connected to the automation system, for example, by means of IO-link-based field buses, wherein an IO-link master forms the interface with the higher-level SPS.

Web-based applications, or, for short, Web applications, for the development, creation, management, use, processing, and/or simulation of devices or device functions in automation systems have been described in detail, for example, by the applicant in the prior German Patent Applications with the filing numbers 10 2008 014 153.4-55 and 10 2008 019 040.3-55. In both applications, the Web applications are preferably realized by means of Ajax technology (Asynchronous JavaScript and XML).

The increasing use of Web-based applications in the field of manufacturing automation and the corresponding automation systems is not least of all also a consequence of the increased use of Ethernet-based and TCP/IP-capable fieldbus systems (industrial Ethernet), such as, e.g., Profinet.

Compared with conventional software applications, Web applications have the advantage, above all, that essentially any operating device can be used that has available a Web browser and a network interface, while software applications must be adapted specially to the hardware and the operating system of each operating device and are installed on this device.

A disadvantage in the use of Web applications, however, is that they must be adapted especially to each device and installed on this device. Also, in addition to the Web application, a Web-server application also must be installed on each of the devices for executing the Web application and providing its function for access by an operating device, wherein each device or its Web server is to respond for access at an individual address. This produces a series of additional disadvantages. These are to be seen, first, in the high complexity produced from the necessary administration and maintenance of each individual device and its Web-server application and, second, in the high device costs produced because each device must have available sufficient resources, in order to be able to execute, in addition to its actual device functions, also the Web-server application as well as the Web application. In addition, previously it was necessary, for example, for configuring a device or its functional module, that the operating device was connected to the corresponding device via a communications connection, in order to be able to transmit the configuration data and store them on the device.

SUMMARY OF THE INVENTION

One problem consists in providing a possibility for simple access to a functional module of a device in an automation system from an operating device, while avoiding at least some of the disadvantages mentioned above.

In accordance with the illustrative embodiment of the present invention, a method for accessing a functional module of an automation system is provided, wherein the automation system comprises a device formed as a higher-level device and comprises at least one lower-level device arranged under this higher-level device. The functional module is further in the form of a part of the one or more lower-level devices and for executing at least one device function. This method comprises the following steps a) to j).

a) An access application is provided to the higher-level device. The access application has at least one application function, wherein the application function can be adapted for accessing an arbitrary lower-level device and its functional module. In addition, this access application comprises at least one first application module.

b) An operating device with input and output devices is provided for operation by a user.

c) This operating device is connected by means of a communications connection to the higher-level device.

d) The one or more first application modules are executed on the higher-level device.

e) An operating interface of the access application is automatically provided to the operating device.

f) By means of this operating interface, the user selects from the application functions provided by the access application.

g) By means of this operating interface, the user selects, for a specific lower-level device on which the access is to be performed, information identifying this device or the user inputs this information identifying the device by means of the operating interface.

h) Fitting the selected or input identification, data are then to be provided that describe the specific lower-level device in detail.

i) As a response to the provided data describing the specific lower-level device in detail, the selected application function and the operating interface are automatically adapted for access to the specific lower-level device and its functional module.

j) Data are exchanged between the operating device and the higher-level device as well as the lower-level device as soon as this is connected to the automation system.

The method of the illustrative embodiment already leads, in particular, to the advantage that, by providing an access application on a higher-level device of the automation system, special resources do not have to be provided to either the operating device or on the lower-level device with the functional module.

Additional advantages are produced as soon as several devices each with a functional module are arranged under the higher-level device, as preferably provided in the method. Also, the access application is then required only on the higher-level device, because its application function can be adapted to an arbitrary lower-level device and its functional module. The administration and maintenance expense is thus limited, furthermore, only to the higher-level device and consequently remains low.

In addition, in the method it is advantageously provided that, between steps d) and g) of the method, lower-level devices connected to the automation system and arranged under the higher-level device are automatically detected and information identifying each lower-level device is read automatically, so that, furthermore in step g) of the method, by means of the operating interface, information identifying a specific lower-level device can be selected from a number of previously designated and read-out information sets, each identifying a lower-level device.

In addition, the method preferably offers, in step g) of the method, the possibility for the input of information identifying a specific lower-level device, wherein the information can also involve the identifying information for a lower-level device initially not connected to the automation system.

Preferably, the data describing the lower-level device in detail are stored in a storage unit of the lower-level device, the higher-level device, the operating device, or in a storage unit of a server on the Internet, wherein the operating device is connected by means of another communications connection at least temporarily to this Internet server.

Alternatively or additionally, in the case of the method, there is the possibility that the data describing a lower-level device in detail are stored in a portable storage unit, for example, a diskette, CD, DVD, or a flash memory, such as a USB stick or a memory card, wherein the operating device comprises a suitable reading device for reading the data from the portable storage unit.

If the data describing the specific lower-level device in detail are stored in a storage unit that can be read by the higher-level device, wherein the storage unit can belong to the higher-level device itself or to a device connected to this higher-level device, in the method it is provided in an especially preferable way that, in step h), the required data are provided automatically.

Advantageously, in the case of the method, the data describing a lower-level device in detail are present as a GSD file (general station description) or an IODD file (IO device description) and/or in the JSON format (JavaScript Object Notation). The transmission of data in step j) of the method is preferably performed in response to user input performed by means of the operating interface.

Furthermore, the data to be transmitted in step j) of the method to the specific lower-level device preferably comprise data describing the device in detail, wherein at least the latter are stored in a storage unit possessed by the higher-level device, that is, especially when these data were stored in a portable storage unit, so that for future access to the same or a similar device, the data describing the device in detail are already present at the central location.

In an especially preferred way, in step j) of the method, it is provided that the data to be transmitted to the specific lower-level device, wherein these data comprise data describing the device in detail, are buffered in a storage unit possessed by the higher-level device, and that the buffered data are transmitted to the specific lower-level device after the specific lower-level device has been automatically detected as a connected device with reference to the information identifying the device. In this way, on one hand, devices and their functional modules that are initially not yet connected to the automation system can also be accessed, for example, for installation and configuration. On the other hand, the data are transmitted to the specific lower-level device after its connection, without the operating device then still having to be connected to the higher-level device.

The data transmitted in step j) of the method to the specific lower-level device, wherein these data comprise the data describing the device in detail, is preferably stored in a storage unit possessed by the lower-level device.

The access application provided to the higher-level device preferably comprises at least one second application module that is transmitted to the operating device by means of the communications connection and is then executed on this device, so that at least a partial reduction of the burden on the higher-level device is achieved, without having to install an application on the operating device.

According to another preferred variant of the method, a server application is provided to and executed on the higher-level device, wherein it involves, in particular, a Web-server application and wherein the one or more first application modules executed in the step d) interact with this application. At this point, the advantage compared with previously known solutions is to be pointed out again that the administration and maintenance expense is also limited with respect to the server application only to one, namely the higher-level, device. In addition, it is possible to access all of the lower-level devices and their functional modules under the higher-level device at only one server address in an extremely practical way.

Furthermore, advantageously one Web-browser application is provided to and executed on the operating device, so that, in step e) of the method, the operating interface of the access application is provided together with the Web-browser application.

In an especially preferred embodiment of the method, it is provided that the one or more second application modules of the access application involve Java Applets or AJAX technology (Asynchronous JavaScript and XML), wherein this assumes a Web-server application on the side of the higher-level device and a Web-browser application on the side of the operating device, as described above.

Preferably, the operating interface provided to the operating device comprises a GUI (graphical user interface).

In the case of the one or more application functions of the access function, it preferably involves an installation function, a processing function, a monitoring function, and/or an analysis function.

The operating device is, in an especially preferred way, a PC, a laptop, a tablet, or a handheld computer.

Furthermore, for solving the problem named above and for performing the method according to the invention, a device of an automation system is provided that involves a higher-level device under which there is at least one lower-level device. The lower-level device here comprises a functional module for executing at least one device function. The higher-level device comprises a first and at least one second communications interface. The first communications interface is designed to connect the higher-level device to an operating device, wherein the higher-level device is designed to communicate with the operating device. The one or more second communications interfaces are designed to connect the higher-level device to the one or more lower-level devices, wherein the higher-level device is also designed to communicate with the one or more lower-level devices.

Furthermore, the higher-level device comprises a storage unit and a processor unit, wherein, in the storage unit, an access application is stored that comprises at least one first application module and wherein the processor unit is designed to execute the one or more first application modules of the access application. This access application is designed to provide at least one application function that can be adapted for accessing an arbitrary lower-level device and its functional module. In addition, this access application is designed to provide an operating interface as well as for adapting the operating interface and the one or more application functions for access to a specific lower-level device and its functional module as a response to information identifying the specific lower-level device and to data describing the specific lower-level device in detail.

In a preferred implementation, the higher-level device is in the form of a memory-programmable controller (SPS) or as a bus coupler.

According to one especially preferred implementation, the higher-level device is in the form of an IO-link master and the one or more second communications interfaces are formed according to the IO-link standard.

Preferably it is further provided that several lower-level devices each with a functional module are arranged under the higher-level device, wherein these are connected together, e.g., by means of a bus, to the one or more second communications interfaces of the higher-level device and/or a number of lower-level devices is each connected individually to another second communications interface of the higher-level device.

Specific to the application, the first communications interface of the higher-level device is designed as a wired or wireless connection to the operating device, wherein, furthermore, the first communications interface is preferably formed according to the Ethernet standard and/or for a TCP/IP-based data transmission.

In a preferred embodiment of the higher-level device, the access application is designed to detect lower-level devices arranged under the higher-level device and connected to the automation system as well as for reading information identifying each lower-level device.

In another preferred embodiment of the higher-level device, the access application is further formed to read data describing a lower-level device in detail from a storage unit in which they are stored, wherein the storage unit can belong to the higher-level device itself or to a device connected to this higher-level device. In particular, here it can involve a storage unit of the lower-level device, the operating device, or a storage unit of a server on the Internet, for example, that of the device manufacturer, with which the operating device is connected at least temporarily by means of a communications connection. The data describing a lower-level device in detail are here present preferably as a GSD file or an IODD file and/or in the JSON format.

Preferably, in another embodiment of the higher-level device, the access application is formed to enable a data transmission between the operating device and the lower-level device in response to user inputs performed by means of the operating interface.

In a further, preferred implementation of the higher-level device, the access application is formed to enable the storage of data in the storage unit of the higher-level device, that is, of the data to be transmitted to the specific lower-level device, at least the data contained therein and describing the specific lower-level device in detail.

In an especially preferred implementation of the higher-level device, the access application is designed to enable buffering of data in the storage unit of the higher-level device, that is, the data to be transmitted to a specific lower-level device that contain the data describing the device in detail. It is further formed to detect the specific lower-level device as a device connected to the automation system with reference to the information identifying the device, and for subsequently enabling a transmission of the buffered data to the specific lower-level device.

In another implementation of the higher-level device, the access application is preferably designed to enable the storage of the data transmitted to a specific lower-level device comprising the data describing the device in detail in a storage unit of the specific lower-level device.

In another preferred embodiment of the higher-level device, the access application comprises at least one second application module, wherein the higher-level device is designed to transmit the one or more second application modules to the operating device for executing the application module on the operating device, wherein the modules are formed to communicate with each other.

It is advantageously provided that, in the storage unit of the higher-level device, a server application, in particular, a Web-server application, is stored and that the processor unit is designed to execute the server application, wherein the access application is further adapted for interacting with the server application.

Furthermore, it is preferably provided that the access application of the higher-level device is designed to provide the operating interface together with a Web-browser application executed on the operating device.

According to one especially preferred embodiment of the higher-level device, it is further provided that the one or more second application modules of the access application involve Java Applets or AJAX technology, which assumes a Web-server application on the side of the higher-level device and a Web-browser application on the side of the operating device, as described above.

According to another preferred embodiment of the higher-level device, the access application is formed to provide an operating interface comprising a GUI on the operating device.

Preferably, in another embodiment of the higher-level device, the access application is designed to provide an installation function, a processing function, a monitoring function, and/or an analysis function as the one or more application functions.

In another advantageous implementation of the higher-level device, it is provided that another application is stored in its storage unit, wherein this application can be executed by the processor unit of the higher-level device and comprises, as an application function, a control function for controlling at least one part of the automation system.

BRIEF DESCRIPTION OF THE DRAWINGS

These and other features, as well as other associated advantages of the invention emerge from the following, more detailed description of a preferred embodiment with reference to FIG. 1.

FIG. 1 shows schematically individual components of an automation system that has been adapted according to the invention.

DETAILED DESCRIPTION

In FIG. 1, reference numeral "200" is used to designate a higher-level device of an automation system not shown in more detail.

Three lower-level devices under this device 200 are designated with 110, 120, and 130 and each has a functional module 118, 128, and 138, respectively, and a memory 115, 125, and 135, respectively.

The higher-level device 200 has a number of communications interfaces 266 to 269 for connecting to lower-level devices. The lower-level devices 110 and 120 are connected by means of communications interfaces not shown in more detail to the communications interfaces 266 and 267, respectively, of the higher-level device 200. According to FIG. 1, the lower-level device 130 is still offline, i.e., it is not yet connected to the higher-level device 200.

The higher-level device 200 further has another communications interface 265 that is connected by means of a communications connection 460 to a communications interface 365 of an operating device 300.

The communications connection 460 can be, as indicated, a part of a network 400 of the automation system or also a separate communications connection between the higher-level device 200 and the operating device 300.

The higher-level device 200 further has a memory 255 and a processor 260, wherein, in the memory 255, for example, an application A is stored that can be executed by the processor 260. In addition, in the memory 255, an access application Z and a Web-server application WS according to the present invention are also stored that can also be executed by the processor 260. The shown access application Z comprises two application modules Z1 and Z2.

The operating device 300 further has a memory 355 and a processor 360, wherein, in the memory 355, a Web-browser application WB is stored that can be executed by the processor 360. The memory 355 further contains, as an example, a device description file D.

The access application Z is designed to interact both with the Web-server application WS and also with the Web-browser application WB on the side of the operating device 300, as described below in more detail.

The operating device 300 can have a CD/DVD drive 380 for reading a CD-ROM 80 and can be connected via the Internet to the memory of a server 500 on the Internet.

In the following preferred embodiments, FIG. 1 thus shows schematically interacting components of an automation system formed according to the invention, in particular, the higher-level device as well as the operating device.

Even when the invention is explained below, in particular, with reference to an access application with an installation function, this is not to be understood as a restriction to such an application function. According to the invention, alternatively or additionally, for example, functions may also be provided for the parameterization, configuration, monitoring, control, or analysis of a lower-level device 110, 120, or 130 and its corresponding functional module 118, 128, and 138, respectively.

In the example shown in FIG. 1, in the case of the higher-level device 200, it involves, e.g., an IO-link master, also designated as simply master below, by means of which several IO-link devices 110, 120, 130 can be connected to a network 400 of the automation system or can be integrated into this network. As is clear from FIG. 1, two IO-link devices 110, 120, also designated, in part, as simply devices below, are here connected initially to the master 200 and thus arranged under this master. Of these devices, one comprises a sensor module 118 as a functional module, while the other comprises an actuator module 128 as a functional module, wherein each device is connected to an IO-link-based communications interface 266, 267 of the master, so that data can be transmitted between the corresponding lower-level device and the master. Another device 130 with a sensor module 138 is not yet connected to the master 200. By means of another communications interface 265 that is constructed according to the Profinet Standard, the master is further connected to the additional network 400 of the automation system.

In a different case than that shown, the higher-level device 200 may also be, e.g., a memory-programmable controller (SPS), wherein here several field devices as lower-level devices may also be connected by means of a common bus to only one communications interface of the SPS.

The IO-link master 200 thus also has available the memory 255 and the processor 260, wherein, in the memory 255, for example, an application A is stored that can be executed by the processor 260, wherein this application comprises a function for controlling or coordinating communications with the lower-level devices. In addition, in the memory the access application Z according to the present invention is also stored, which can also be executed by the processor 260 and which comprises, in the example shown here, an installation function as the application function or access function.

According to the invention, this installation function initially has a device-neutral construction and thus can basically be applied for the installation of any lower-level devices and their functional modules. A specific adaptation of the installation function to a specific device and its functional module is possible with the help of so-called device description files that contain a set of data describing a device in detail and that are made available as a rule by the appropriate device manufacturer. Such device description files are also designated as GSD files (general station description) and, in the case of IO-link devices, as IODD files (IO device description), wherein the data within such files is structured, e.g., in the JSON format (JavaScript object notation).

The operating device 300, which can involve, e.g., a laptop computer, is connected by means of its communications interface 365 constructed according to the Ethernet standard at an essentially freely selectable access point to the similarly Ethernet-based as well as TCP/IP-based Profinet network 400 of the automation system and thus also to the IO-link master 200. As an output device, the laptop computer 300 has available an LCD display not shown in the Figure and as an input device, there is a similarly not illustrated keyboard on the laptop 300. Furthermore, in this case the laptop computer 300 has the memory 355 in which, in addition to other applications, also a known Web-browser application WB is stored that can be executed by the processor 360. Instead of the laptop computer, the operating device 300 may alternatively involve, for example, a tablet computer or a conventional PC. In addition, instead of a wired connection as the communications connection 460, the operating device 300 may also be connected by means of a wireless connection, such as a WLAN, to the higher-level device 200, as long as the communications interface 365 of the operating device as well as the access point of the network 400 is suitably constructed. Furthermore, the operating device 300 may also be connected directly to the higher-level device 200 instead of via a network.

Furthermore, in the memory 255 of the IO-link master 200, a Web-server application WS is also stored that can also be executed by the processor 260 of the master. The access application Z is designed to interact both with the Web-server application WS and also with the Web-browser application WB on the side of the operating device 300, that is, preferably such that, according to the request/response principle between the Web browser and Web server, in response to a request, an operating interface of the access application is provided to the operating device, i.e., a graphical user interface (GUI) or operating interface is displayed on the LCD display of the laptop computer. For example, if a user inputs the address of the Web server of the IO-link master into the address bar of the Web browser WB on the laptop computer 300 by means of the keyboard with the intention of setting one of the IO-link devices 110, 120, 130 in operation, then the Web server WS transmits, in response to this request and in interaction with the access application Z, a first Web page, also called a start page, provided to this server, to the Web browser WB that the browser then presents to the user.

The access application preferably has a modular construction in practice, wherein, in the example shown according to FIG. 1, there are two application modules Z1, Z2, of which only the first Z1 is executed on the master 200, i.e., by the processor 260 of the master. This first module Z1 of the access application Z provides, among other things, for the previously described provision of a start page. This start page shown in the Web browser WB offers to the user a selection overview on the available functions of the access application. The user then has the possibility to select from this overview the desired access function, wherein, in this case, only one access function, namely the installation function, is executed.

After selection of the installation function and after transmission of this selection to the Web server WS of the IO-link master 200, this transmits, as a response and in interaction with the access application or its first application module Z1, not only a second Web page, but, above all, also program code to the Web browser WB of the operating device 300. In the case of this program code, it involves the second module of the access application Z2 that comprises the installation function. The transmission of the second application module Z2 is indicated in FIG. 1 by the dashed line. This second module Z2 is preferably formed as a Java Applet that is embedded in the second Web page and is executed on the operating device 300, i.e., by its processor.

In a different case than that shown here, the second module Z2 can be implemented, e.g., by means of AJAX technology that similarly represents a possibility for transmitting program code from a Web server to a Web browser, so that it is executed there on the side of the operating device. It is further possible that the access application provides several access functions and comprises more than two application modules that are transmitted to the operating device and executed there after their selection. This modular construction of the access application and the execution of application modules on the side of the operating device produce significant contributions to reducing the burden on the processor of the higher-level device 200.

However, it should be noted that the modularity of the access application as well as the execution of individual modules on the side of the operating device are not essential features of the invention. Instead, all of the application modules may also be executed on the higher-level device or the access application may have a monolithic construction.

As already mentioned, according to the invention, the installation function initially has a device-neutral construction and requires, for adaptation to a specific device and its functional module, additional data that describe the device in detail. Embedded in the second Web page, the Java Applet, that is, the second module Z2, offers to the user a selection overview of the lower-level devices 110, 120 connected to the higher-level device 200 and arranged under this higher-level device. The prior detection of these devices as well as the reading of information identifying each device, such as, e.g., a serial number or a device designation from a detected device, is performed in advance by the first application module Z1, wherein the read information is then transmitted to the second module Z2. For example, the selection overview contains entries for the device 110 with the sensor module 118 and each device 120 with the actuator module 128. In addition, on the second Web page there is also an input field in which the user can input, for example, the identifying information for the device 130 that has not yet been connected to the master 200.

After selection of the device 110 with the sensor module 118 as the device to be put in operation, a description file fitting the device is required for the device-specific adaptation of the installation function. This file can be provided in various ways as a function of where this file is stored. Possible storage locations are the memory 355 of the operating device 300 or the memory 255 of the master 200 or else also a memory 115 in the lower-level device 110 itself, as well as, furthermore, a server 500 on the Internet, for example, that of the device manufacturer, or a CD-ROM 80, that may likewise be made available by the manufacturer of the device.

In the present case it is assumed that the device description file is located as the device description file D in the memory 355 of the laptop computer. The access application, here, in particular, the second module Z2, is formed to search, with reference to the selected identification information of the device 118, through the storage units located in the operating device for the fitting device description file D, so that the required file is found automatically. Also automatically, the operating interface shown in the Web browser WB is then adapted by the second module Z2, without another Web page having been transmitted or having to be transmitted from the Web server WS. Under the assumption that the adaptation of the operating interface is performed in connection with the adaptation of the installation function to the device 110 with the sensor module 118, on the so-called installation interface, a series of operating elements with respect to the installation of this device, such as, for example, for the input or setting of parameters, are now made available to the user.

It also lies within the scope of the invention that the second module Z2 is formed to search through a CD-ROM 80 located in the CD/DVD drive 380 of the operating device as well as, in the case of an existing connection of the operating device to the Internet, through the memory of a server 500 on the Internet for the required device description file and optionally to download this file. Naturally, the user may also manually specify the file to be used. Furthermore, the first module Z1 of the access application Z may also perform an automatic search for the device description file in the memory of the IO-link master 255 and/or the IO-link device 115, that is, as a response to the request of the second module Z2, wherein, after locating the file, this is transmitted to the second module.

After all of the settings required for the installation of the device 110 have been made by the user, all of the data set by the user as well as the data describing the device are transmitted first to the first module Z1 that then provides for the forwarding of the data to the specific device 110 and storage of the data in its memory 115. It is further provided according to the invention that by the first module Z1, the device description data are also stored in the memory 255 of the higher-level device 200, so that they are already available for later use at the central location.

Another aspect of the invention is that the access application Z can also be used for so-called offline accesses, that is, for example, for the installation of devices that are not yet connected to the automation system, i.e., not yet connected to the higher-level device. The user therefore has the ability to prepare, to a large extent, the installation of such a device, in that he can already make all of the necessary settings.

With respect to the above description, e.g., also the other device 130 with the sensor module 138 that is not yet connected to the master 200 should be set in operation. For this purpose, the user resets the installation function to the original neutral state, so that, in the Web browser WB, the selection overview on the devices connected to the master is displayed again, as well as, furthermore, the input field in which the user now inputs the identifying information for the not-connected device 130. Then the operating interface and the installation function are adapted again to the specific device 130 by the second module Z2 after the required device description file has been automatically found or specified by the user. An installation interface with a series of operating elements with respect to the installation of the device 130 with sensor module 138 is then made available again to the user. After all of the settings required for the installation have been performed by the user, a transmission of all of the data to the first module Z1 is performed, wherein this now causes initially a buffering of the data in the memory 255 of the master.

The first application module Z1 is, as already mentioned, in the position to detect lower-level devices connected to the master 200 as well as to read information identifying the device. The first application module Z1 thus can also recognize when another device is connected and can also identify this device. Now if the device 130 is connected to the master, the first module Z1 recognizes this and tests, with reference to the read identification information, whether the installation data buffered in the memory 255 are designated for the newly connected device. If this is the case, the first module Z1 allows the forwarding of the buffered data to the device 130 as well as the storage of the data in its memory 135.

For the user, this solution thus also means that after completion of the transmission of the data to the first module Z1 of the access application, the operating device 300 no longer must be connected to the higher-level device 200.

In summary, an automation system is thus provided that comprises a higher-level device 200 and at least one lower-level device 110, 120, 130 arranged under this higher-level device and wherein a functional module 118, 128, 138 is in the form of part of the one or more lower-level devices 110, 120, 130 and for executing at least one device function.

Based on such an automation system, according to the above description, a method for accessing the functional module 118, 128, 138 of this automation system is applied that comprises the steps: a) providing an access application Z with at least one application function to the higher-level device 200, wherein the application function can be adapted for accessing an arbitrary lower-level device and its functional module and wherein the access application comprises at least one first application module Z1, Z2; b) providing an operating device 300 that comprises input and output devices for operation by a user; c) connecting the operating device to the higher-level device by means of a communications connection 460; d) executing the one or more first application modules on the higher-level device; e) automatically providing an operating interface of the access application on the operating device; f) selecting a specific application function by means of the operating interface; g) selecting or inputting information identifying a specific lower-level device by means of the operating interface; h) providing data (D) fitting the selected or input identification information and describing the specific lower-level device in detail; i) automatically adapting the selected application function and the operating interface for access to the specific lower-level device and its functional module as a response to the provided data describing the specific lower-level device in detail; and j) transmitting data between the operating device and the higher-level device as well as the specific lower-level device after its connection to the automation system.

Furthermore, to perform this method, according to the above description, a higher-level device 200 of this automation system is provided, wherein this device comprises: a first communications interface 265 that is designed to connect the higher-level device to an operating device 300, wherein the higher-level device is designed to communicate with the operating device; at least one second communications interface 266, . . . , 269 that is designed to connect the higher-level device to the one or more lower-level devices, wherein the higher-level device is designed to communicate with the one or more lower-level devices; a storage unit 255 with an access application Z stored in this unit that comprises at least one first application module Z1, Z2; and a processor unit 260 that is designed to execute the one or more first application modules of the access application; wherein the access application is formed, in turn: to provide at least one application function that can be adapted for accessing an arbitrary lower-level device and its functional module; to provide an operating interface on the operating device; and to adapt the operating interface and the one or more application functions for access to a specific lower-level device and its functional module as a response to information identifying the specific lower-level device and to data describing the specific lower-level device in detail.

What is claimed is:

1. Method for accessing a functional module of an automation system, wherein the automation system comprises a higher-level device and at least one field device arranged as a lower-level device under this higher-level device and wherein the functional module is configured as part of the one or more lower-level devices and is designed to execute at least one device function, the method comprising:
   a) providing an access application with at least one application function to the higher-level device, wherein the application function is adapted to access an arbitrary lower-level device and its functional module and wherein the access application comprises at least one first application module and at least one second application module;
   b) providing an operating device that comprises input and output devices for operation by a user;
   c) connecting the operating device to the higher-level device by means of a communications connection;
   d) executing the one or more first application modules on the higher-level device, wherein the at least one second application module of the access application is transmitted to the operating device and executed there;
   e) automatically providing an operating interface of the access application on the operating device;
   f) selecting a specific application function by means of the operating interface;
   g) selecting or inputting information identifying a specific lower-level device by means of the operating interface;
   h) providing data matching the selected or input identification information and describing the specific lower-level device in detail;
   i) automatically adapting the selected application function and the operating interface for access to the specific lower-level device and its functional module as a response to the provided data describing the specific lower-level device in detail; and j) transmitting data between the operating device and the higher-level device, as well as the specific lower-level device after the lower-level device is connected to the automation system.

2. Method according to claim 1, wherein the automation system comprises several lower-level devices arranged below the higher-level device, wherein each lower-level device has a functional module.

3. Method according to claim 1, wherein, between steps d) and g) of the method, connected, lower-level devices are automatically detected and information identifying each lower-level device is automatically read, and wherein, in step g) of the method, a selection is made from a number of previously designated and read information sets, each identifying a lower-level device.

4. Method according to claim 1, wherein, in step g) of the method, the information for identifying the specific, lower-level device is inputted, at which point the lower-level device is not yet connected to the automation system.

5. Method according to claim 1, wherein the data describing the lower-level device in detail are stored in a storage unit that is possessed by the lower-level device, the higher-level device, the operating device, or a server on the Internet to which the operating device is at least temporarily connected by means of another communications connection.

6. Method according to claim 1, wherein the data describing a lower-level device in detail are stored in a portable storage unit, which is readable by means of a suitable reading device possessed by the operating device.

7. Method according to claim 1, wherein, in step h), the data are provided automatically if the data describing the specific lower-level device in detail are stored in a storage unit that is readable by the higher-level device.

8. Method according to claim 1, wherein the data describing the lower-level device in detail are present as a GSD file (general station description) or IODD file (TO device description) and/or in the JSON format (JavaScript Object Notation).

9. Method according to claim 1, wherein, in step j) of the method, data are transmitted as a response to user input performed by means of the operating interface.

10. Method according to claim 1, wherein, in step j) of the method, the data to be transmitted to the specific lower-level device comprise the data describing the device in detail and wherein at least the data describing the specific lower-level device in detail are stored in a storage unit possessed by the higher-level device.

11. Method according to claim 4, wherein, in step j) of the method, the data to be transmitted to the specific lower-level device, wherein these data comprise the data describing the device in detail, are buffered in a storage unit possessed by the higher-level device, and wherein the buffered data are transmitted to the specific lower-level device after the device has been automatically detected as a connected device with reference to the information identifying the device.

12. Method according to claim 1, wherein, in step j) of the method, the data transmitted to the specific lower-level device, wherein this device contains the data describing the lower-level device in detail, are stored in a storage unit possessed by the lower-level device.

13. Method according to claim 1, wherein, in step d) of the method, the one or more first application modules are executed in interaction with a server application provided and executed on the higher-level device.

14. Method according to claim 13, wherein, in step e) of the method, the operating interface of the access application is provided together with a Web-browser application (WB) provided and executed on the operating device.

15. Method according to claim 1, wherein the one or more second application modules (Z2) involve Java Applets or AJAX technology (Asynchronous JavaScript and XML).

16. Method according to claim 1, wherein the provided operating interface comprises a GUI (graphical user interface).

17. Method according to claim 1, wherein the one or more application functions are an installation function, a processing function, a monitoring function, and/or an analysis function.

18. Method according to claim 1, wherein the operating device (300) is a PC, a laptop, a tablet, or a handheld computer.

19. Device that is in the form of a higher-level device (200) of an automation system, wherein at least one field device comprising a functional module for executing at least one device function is arranged as a lower-level device under the higher-level device, the device comprising:

a first communications interface that is designed to connect the higher-level device to an operating device, wherein the higher-level device is designed to communicate with the operating device;

at least one second communications interface that is designed to connect the higher-level device to the one or more lower-level devices, wherein the higher-level device is designed to communicate with the one or more lower-level devices;

a storage unit with an access application stored in this unit, wherein this application comprises at least one first application module and at least one second application module; and a processor unit that is designed to execute the one or more first application modules of the access application, wherein the higher level device is designed to transmit at least one second application module of the access application to the operating device for executing the application module on the operating device, and wherein the application modules are configured to communicate with each other;

wherein:

the access application is designed to provide at least one application function that is adapted to access an arbitrary lower-level device and its functional module;

the access application is designed to provide an operating interface on the operating device; and the access application is designed to adapt the operating interface and the one or more application functions for access to a specific lower-level device and its functional module as a response to information identifying the specific lower-level device and to the data describing the specific lower-level device in detail.

20. Device according to claim 19, configured as a memory-programmable controller (SPS) or as a bus coupler.

21. Device according to claim 19, configured as an IO-link master and wherein the one or more second communications interfaces are configured according to the IO-link standard.

22. Device according to claim 19, wherein, under this device, several devices are arranged, each with a functional module and wherein the lower-level devices are connected to the one or more second communications interfaces of the higher-level device and/or a number of lower-level devices are each connected individually to another second communications interface of the higher-level device.

23. Device according to claim 19, wherein the first communications interface is configured as a wired or wireless connection to the operating device.

24. Device according to claim 19, wherein the first communications interface is configured according to the Ethernet standard and/or for a TCP/IP-based data transmission.

25. Device according to claim 19, wherein the access application is further configured to detect connected lower-level devices and for reading at least one information set identifying the appropriate lower-level device.

26. Device according to claim 19, wherein the access application is further designed to read the data describing the lower-level device in detail from a storage unit in which it is stored, wherein this unit may be the storage unit of the higher-level unit or a storage unit possessed by the lower-level device, the operating device, or a server on the Internet with which the operating device is connected at least temporarily by means of a communications connection, and wherein the data describing a lower-level device in detail are present as a GSD file or an IODD file and/or in the JSON format.

27. Device according to claim 19, wherein the access application is further configured to enable data transmission between the operating device and the lower-level device as a response to user input performed by means of the operating interface.

28. Device according to claim 19, wherein the access application is designed to enable storage in the storage unit of the higher-level device, that is, at least the data describing the specific lower-level device in detail, wherein these data are possessed by the data to be transmitted to the specific lower-level device.

29. Device according to claim 19, wherein the access application is designed to enable buffering in the storage unit of the higher-level device, that is, the data to be transmitted to a specific lower-level device, wherein these data comprise the data describing the device in detail, and wherein the access application is further configured to detect the specific lower-level device as a connected device with reference to the information identifying the device, and for subsequently enabling transmission of the buffered data to the specific lower-level device.

30. Device according to claim 19, wherein the access application is designed to result in storage in a storage unit of the specific lower-level device, that is, the data transmitted to the device, wherein these data comprise the data describing the device in detail.

31. Device according to claim 19, further comprising a server application stored in the storage unit of the higher-level device, wherein the processor unit is designed to execute the server application, and wherein the access application is adapted for interaction with the server application.

32. Device according to claim 31, wherein the access application is designed to provide the operating interface in interaction with a Web-browser application (WB) executed on the operating device.

33. Device according to claim 20, wherein the one or more second application modules involve Java Applets or AJAX technology.

34. Device according to claim 19, wherein the access application is designed to provide an operating interface comprising a GUI.

35. Device according to claim 19, wherein the access application is designed to provide an installation function, a processing function, a monitoring function, and/or an analysis function as the one or more application functions.

36. Device according to claim 19, wherein, in the storage unit of the higher-level device, another application (A) is stored that is executable by the processor unit and that comprises, as an application function, a control function for controlling at least one part of the automation system.

* * * * *